(12) United States Patent
Lin (10) Patent No.: US 6,327,560 B1
(45) Date of Patent: Dec. 4, 2001

(54) CHINESE CHARACTER CONVERSION APPARATUS WITH NO NEED TO INPUT TONE SYMBOLS

(75) Inventor: Chi-Hsuen Lin, Taipei (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/468,832

(22) Filed: Dec. 22, 1999

(30) Foreign Application Priority Data

Feb. 17, 1999 (JP) .................................................. 11-038700

(51) Int. Cl.[7] ............................. G06F 17/21; G06F 17/24
(52) U.S. Cl. ..................................... 704/8; 704/1; 707/535
(58) Field of Search ...................... 704/1, 8, 10; 707/534, 707/535, 536, 532; 400/109, 110, 484; 434/156, 157, 159, 160, 167, 169; 345/171; 382/185; 341/28

(56) References Cited

U.S. PATENT DOCUMENTS

| | | | | |
|---|---|---|---|---|
| 5,109,352 | * | 4/1992 | O'Dell | 707/542 |
| 5,164,900 | * | 11/1992 | Bernath | 707/535 |
| 5,175,803 | * | 12/1992 | Yeh | 707/535 |
| 5,319,552 | * | 6/1994 | Zhong | 707/535 |
| 5,331,557 | * | 7/1994 | Liu | 707/535 |
| 5,832,478 | * | 11/1998 | George | 707/3 |
| 5,835,924 | * | 11/1998 | Maruyama et al. | 707/535 |
| 5,893,133 | * | 4/1999 | Chen | 707/535 |
| 6,014,615 | * | 1/2000 | Chen | 704/3 |
| 6,073,146 | * | 6/2000 | Chen | 707/535 |

FOREIGN PATENT DOCUMENTS

| | | |
|---|---|---|
| 089476 | 8/1987 | (CN) . |
| 40901274A | * 4/1997 | (JP) . |

OTHER PUBLICATIONS

English Language Summary of R.O.C. Patent Publication No. 089476.

* cited by examiner

Primary Examiner—Joseph Thomas
(74) Attorney, Agent, or Firm—Greenblum & Bernstein P.L.C.

(57) ABSTRACT

A Chinese character conversion apparatus with no need to input tone symbols increases the input efficiency. The Chinese character conversion apparatus can sever automatically the successive input phonetic symbols into a plurality of syllables that are in consistent with the phonetic combination rule, no matter whether there is a tone symbol input or not. Each syllable or each syllable stream constituted from a plurality of syllables has a group of corresponding homonymous characters or phrases in the dictionary. Since the input of the tone symbol may be omitted in the present invention, the input speed of the user may be increased. Furthermore, incorrect input caused by incorrect tone symbol can thus be avoided.

1 Claim, 6 Drawing Sheets

CONSONANTS : ㄅㄆㄇㄈㄉㄊㄋㄌㄍㄎㄏㄐㄑㄒㄓㄔㄕㄖㄗㄘㄙ

TRANSITION VOWELS : ㄧㄨㄩ

VOWELS : ㄚㄛㄜㄝㄞㄟㄠㄡㄢㄣㄤㄥㄦ

TONES : ‾ ˊ ˇ ˋ ˙

FIG.6

CHINESE CHARACTER CONVERSION APPARATUS WITH NO NEED TO INPUT TONE SYMBOLS

BACKGROUND OF THE INVENTION

1. (Field of the Invention)

This invention relates to a Chinese character conversion apparatus for converting a Chinese character from an input row of phonetic symbols in a computer system.

2. (Description of the Prior Art)

The total number of traditional Chinese characters by the Big5 codes used in computer system is 13051. The key to the popularization of computer system in Chinese is how to quickly and correctly input Chinese characters. Presently, the input of a Chinese character in computer system can be achieved by way of speech recognition, script recognition and keyboard operation. Using a keyboard to input the Chinese character is yet still be the most reliable method, and is the most popular method. A Chinese character can be inputted by a user through the keyboard in accordance with the pronunciation or the form of the Chinese character to be inputted. Although inputting a Chinese character through the keyboard in accordance with the form of the Chinese character to be inputted has the advantage of faster input speed, however, it is difficult for the user to remember a large number of rules which are used to take apart a Chinese character into a plurality of parts for input. Therefore, in some places like Taiwan, most of the computer users prefer the use of Chinese phonetic symbols to input Chinese characters especially because they have been trained in Chinese phonetics since their elementary years.

The Chinese phonetic symbols which are assigned as the teaching material in elementary schools in Taiwan are shown below. The Chinese phonetic symbols can be grouped into four major groups, i.e. the vowels, transition vowels, consonants and tones. In the present invention, the symbol '. . . ' represents the first tone, however, it must be noted that, there is actually no symbol for the first tone.

Consonants: ㄅ(b) ㄆ(p) ㄇ(m) ㄈ(f) ㄉ(d) ㄊ(t) ㄋ(n) ㄌ(l) ㄍ(g) ㄎ(k) ㄏ(h) ㄐ(j) ㄑ(q) ㄒ(x) ㄓ(zh) ㄔ(ch) ㄕ(sh) ㄖ(r) ㄗ(z) ㄘ(c) ㄙ(s)

Transition vowels: ㄧ(i) ㄨ(u) ㄩ(v)

Vowels: ㄚ(a) ㄛ(o) ㄜ(e) ㄝ(e) ㄞ(ai) ㄟ(ei) ㄠ(ao) ㄡ(ou) ㄢ(an) ㄣ(en) ㄤ(ang) ㄥ(eng) ㄦ(er)

Tones: . . . (First tone), ˊ(Second tone), ˇ(Third tone), ˋ(Fourth tone), ˙(light tone)

Each syllable, or character sound, is constituted by the consonant, the transition vowel, the vowel or the tone. In addition to the tone, any one, two or all of the consonant, the transition vowel and the vowel may be simultaneously contained in one syllable. For example,

| Chinese character | Syllable (Tone included) |
|---|---|
| 松 | ㄙㄨㄥ… |
| 下 | ㄒㄧㄚˋ |
| 電 | ㄉㄧㄢˋ |
| 器 | ㄑㄧˋ |
| 技 | ㄐㄧˋ |
| 術 | ㄕㄨˋ |
| 開 | ㄎㄞ… |

| Chinese character | Syllable (Tone included) |
|---|---|
| 發 | ㄈㄚ… |
| 股 | ㄍㄨˇ |
| 份 | ㄈㄣˋ |
| 有 | ㄧㄡˇ |
| 限 | ㄒㄧㄢˋ |
| 公 | ㄍㄨㄥ… |
| 司 | ㄙ… |

As shown by the above example, a so-called syllable stream is constituted by a plurality of successive syllables, which can be converted into a row of Chinese characters. Each syllable may have at least one corresponding homonymous character. Presently, according to the Mandarin Dairy News-paper Dictionary, the total number of reasonable syllables is 1364. A reasonable syllable must have at least one corresponding homonymous, in addition to the reasonable syllable have to be arranged according to the acceptable arrangement sequence of the consonant, transition vowel, vowel and tone. For example, "ㄐㄧㄚˋ" is not a reasonable syllable, since the arrangement sequence of the transition vowel and the vowel is exchanged. "ㄅㄧㄩˊ" is also not a reasonable syllable, since it has no corresponding Chinese character, although the arrangement sequence of the phonetic symbols is correct.

Since there are many Chinese homonymous characters, the need to select a correct Chinese character from a plurality of homonymous characters after the completion of the input of the corresponding phonetic symbol(s) of each syllable reduces the input speed. Since the total number of Chinese homonymous phrases is less than the total number of Chinese homonymous characters in comparison, and since the total number of Chinese phrases is more than the total number of single Chinese word in a text, the need to select a correct Chinese character from a plurality of homonymous characters is reduced if the phonetic symbol input is in the form of Chinese phrase. In the recent years, by the combination of Chinese phrase input with the semantic and syntactic process, the percentage of getting a correct Chinese character by the phonetic input method reaches 95% and above, that is, the need to select a correct Chinese character/phrase from a plurality of homonymous characters/phrases is within 5%.

Figure 5:
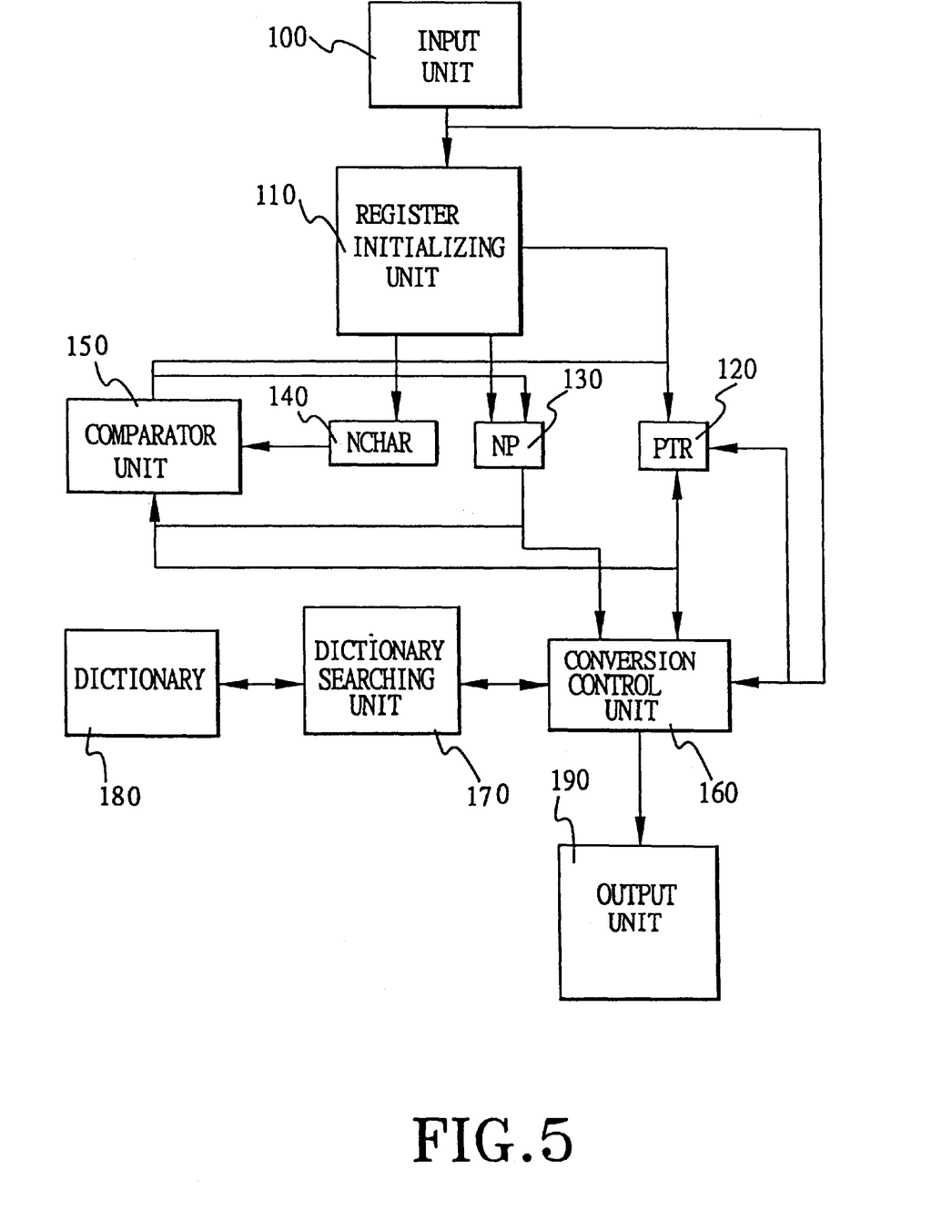
FIG. 5 is a block diagram of a conventional Chinese character conversion apparatus.

A conventional Chinese character conversion apparatus has been disclosed in the ROC patent application Ser. No 75105838. FIG. 5 is a block diagram of the conventional Chinese character conversion apparatus of the above ROC patent application. Reference numeral 100 denotes an input unit for inputting a row of phonetic symbols. Reference numeral 180 denotes a dictionary for storing a plurality of Chinese characters for conversion. Reference numeral 140 denotes a NCHAR register for storing the number of the syllables of the input row of phonetic symbols. Reference numeral 120 denotes a PTR register for storing the conversion starting position of the input row of phonetic symbols. Reference numeral 130 denotes a NP register for storing the conversion length of the input row of phonetic symbols. Reference numeral 150 denotes a comparator unit for decreasing the value of the NP register by one after the completion of the conversion of the character with a certain length so as to maintain the principle of giving priority to the conversion of the character with longer length. Reference numeral 160 denotes a conversion control unit. The conversion control unit 160 orderly moves the setting position of the PTR register 120 starting from the input initial position and determines whether there is a converted syllable. If there is no converted syllable, and the dictionary 180 has the corresponding character, the conversion control unit 160 converts the syllable. Reference numeral 170 denotes a dictionary searching unit for searching the dictionary 180 with the syllable from the conversion control unit 160 as a searching key. Reference numeral 190 denotes an output unit for outputting the Chinese character resulted by the conversion control unit 160.

The phonetic input method used in the aforementioned conventional Chinese character conversion apparatus is as same as the traditional phonetic input method. Although it consists with the habit of the traditional user, however, it has the following drawback:

There is an inconsistent tone between the pronunciation and the phonetic symbols. For example, the phonetic symbols for "總統" are "ㄗㄨㄥv ㄊㄨㄥv". The phonetic symbols for each Chinese character contain a tone symbol for third tone. However, in speaking, the third tone of the former Chinese character "總" must be changed to the second tone, that is, the phonetic symbols for "總統" in speaking are "ㄗㄨㄥ/ㄊㄨㄥv". This may result in an incorrect tone symbol input. Furthermore, when the user cannot distinguish correctly the tone of a Chinese character, a correct Chinese character cannot be inputted by way of the phonetic symbol input method. Therefore, if the tone symbol can be omitted in the input of the phonetic symbols, the aforementioned problem can be avoided. Furthermore, the total number of key operations by the user can also be reduced. For example, if the input phonetic symbols for the Chinese characters "總統" are reduced to "ㄗㄨㄥㄊㄨㄥ", the Chinese characters "總統" can still be converted. It is because "ㄥ" is a vowel while "ㄊ" is a consonant, so that the two syllables "ㄗㄨㄥ" and "ㄊㄨㄥ" can be easily severed according to the acceptable arrangement sequence of the consonant, transition vowel, vowel and tone. However, in the situation of omitting the tone symbol, some syllables are not easy to be severed from another. For example, "ㄊㄧㄢ" can be recognized as a single syllable and can be converted into a Chinese character "天". However, "ㄊㄧㄢ" can be recognized as two successive syllables, "ㄊㄧ" and "ㄢ", and can be converted into a Chinese phrase "提案". In this case, the present invention determines it as a single syllable, so that the Chinese character "天" is converted. If the user recognized that it is a wrong result, that is, "ㄊㄧㄢ" should contain two successive syllables, a special symbol "'" may be added between the phonetic symbols that represent the two syllables, that is, "ㄊㄧ'ㄢ", so that the Chinese phrase "提案" can be correctly converted. It should be noted that the total number of homonymous characters may be increased in the present invention. It is because many Chinese characters having the same consonant, transition vowel and vowel but different tone becomes the homonymous characters of each other due to the omission of the tone symbol. For example, when the phonetic symbols "ㄙㄨㄥ" are inputted, "松" and "送" become the homonymous characters of each other. When the phonetic symbols "ㄅㄟㄐㄧㄥ" are inputted, "北京" and "背景" become the homonymous phrases of each other. The total number of syllables without the tone is 409. The selecting operation of a correct character/phrase from a plurality of homonymous characters/phrases by the user can be reduced by the enhancement of Chinese syntactic and semantic process to select automatically the character/phrase with top priority. Since the object of the present invention is to omit the input of tone symbol, the user can choose to input tone symbol in the case that there are many homonymous characters/phrases, and choose not to input tone symbol in the case that the tone of the character is ambiguous or the reduction of key operation is desired.

The following is an example of input phonetic symbols without tone symbol.

| Chinese character | Syllable (Tone not included) |
| --- | --- |
| 松 | ㄙㄨㄥ |
| 下 | ㄒㄧㄚ |
| 電 | ㄉㄧㄢ |
| 器 | ㄑㄧ |
| 技 | ㄐㄧ |
| 術 | ㄕㄨ |
| 開 | ㄎㄞ |
| 発 | ㄈㄚ |
| 股 | ㄍㄨ |
| 分 | ㄈㄣ |
| 有 | ㄧㄡ |
| 限 | ㄒㄧㄢ |
| 公 | ㄍㄨㄥ |
| 司 | ㄙ |

From the above example, it is found that one syllable can easy to be distinguished from another. On the other hand, "ㄙㄨㄥ" can be separated to "ㄙ" and "ㄨㄥ", "ㄒㄧㄚ" can be separated to "ㄒㄧ" and "ㄚ", "ㄉㄧㄢ" can be separated to "ㄉㄧ" and "ㄢ", "ㄕㄨ" can be separated to "ㄕ" and "ㄨ", "ㄧㄡ" can be separated to "ㄧ" and "ㄡ", "ㄒㄧㄢ" can be separated to "ㄒㄧ" and "ㄢ". However, it seems to be corrected that each group of the aforementioned successive phonetic symbols is determined as one syllable according to the present invention.

SUMMARY OF THE INVENTION

In order to overcome the aforementioned problem, the present invention is to provide a Chinese character conversion apparatus without tone symbol input, which Chinese character conversion apparatus without tone symbol input comprises:

a phonetic symbol memory unit for storing a plurality of symbols for consonants, transition vowels, vowels and tones;

a dictionary for storing a plurality of syllable streams and the corresponding Chinese characters and phrases;

a syllable severing unit, said syllable severing unit severing the phonetic symbols from the input phonetic symbol row to form syllable according to the tone symbol or space key, if no tone symbol or space key being inputted, said syllable severing unit severing the phonetic symbols from the input phonetic symbol row to form syllable according to the order rule of the arrangement of the consonant, transition vowel and vowel in said phonetic symbol memory unit; a conversion initializing unit for setting the conversion starting location and the conversion length according to the syllable obtained from said syllable severing unit and the syllable stream constituted by the syllable obtained from said syllable severing unit and the previously input syllable;

a conversion processing unit for repeatedly adjusting the syllable stream constituted by the conversion starting location and the conversion length according to the set conversion starting location and the conversion length;

a dictionary searching unit for searching said dictionary for Chinese character with the syllable stream from said conversion processing unit as the searching key;

a syllable editing unit, said syllable editing unit being operated by the user to amend the Chinese character searched from the dictionary due to the mistake of syllable severance; and a homonymous character/phrase selecting unit, said homonymous character/phrase selecting unit being operated by the user to select a correct Chinese character other than the Chinese character searched from the dictionary due to the mistake of the determination of the homonym.

According to the aforementioned structure of the present invention, the syllable severing unit severs the input phonetic symbol row into at least one syllable according to the tone symbol or space key. If no tone symbol or space key is inputted, the syllable severing unit severs the input phonetic symbol row into the syllables according to the acceptable arrangement sequence of the consonant, transition vowel and vowel. Then, the conversion initializing unit sets the conversion starting position and the conversion length according to the syllables from the syllable severing unit and the syllable stream constituted by the syllables from the syllable severing unit and the previously input syllable. Afterwards, the conversion processing unit repeatedly adjusts the syllable stream constituted by the conversion starting position and the conversion length according to the set conversion starting position and the conversion length. Then, a dictionary searching unit searches the dictionary for Chinese character/phrase with the syllable stream from the conversion processing unit as the searching key. Then, the syllable editing unit is operable by the user to amend the Chinese character/phrase searched from the dictionary due to the mistake made by the syllable severing unit. Lastly, the homonymous character/phrase selecting unit is operable by the user to select a correct Chinese character/phrase other than the Chinese character/phrase searched from the dictionary due to the mistake made by the automatic determination of the homonymous character/phrase.

BRIEF DESCRIPTION OF THE DRAWINGS

Other features and advantages of the present invention will become apparent in the following detailed description of the preferred embodiment with reference to the accompanying drawings, in which.

DESCRIPTION OF THE EMBODIMENT

Figure 1:
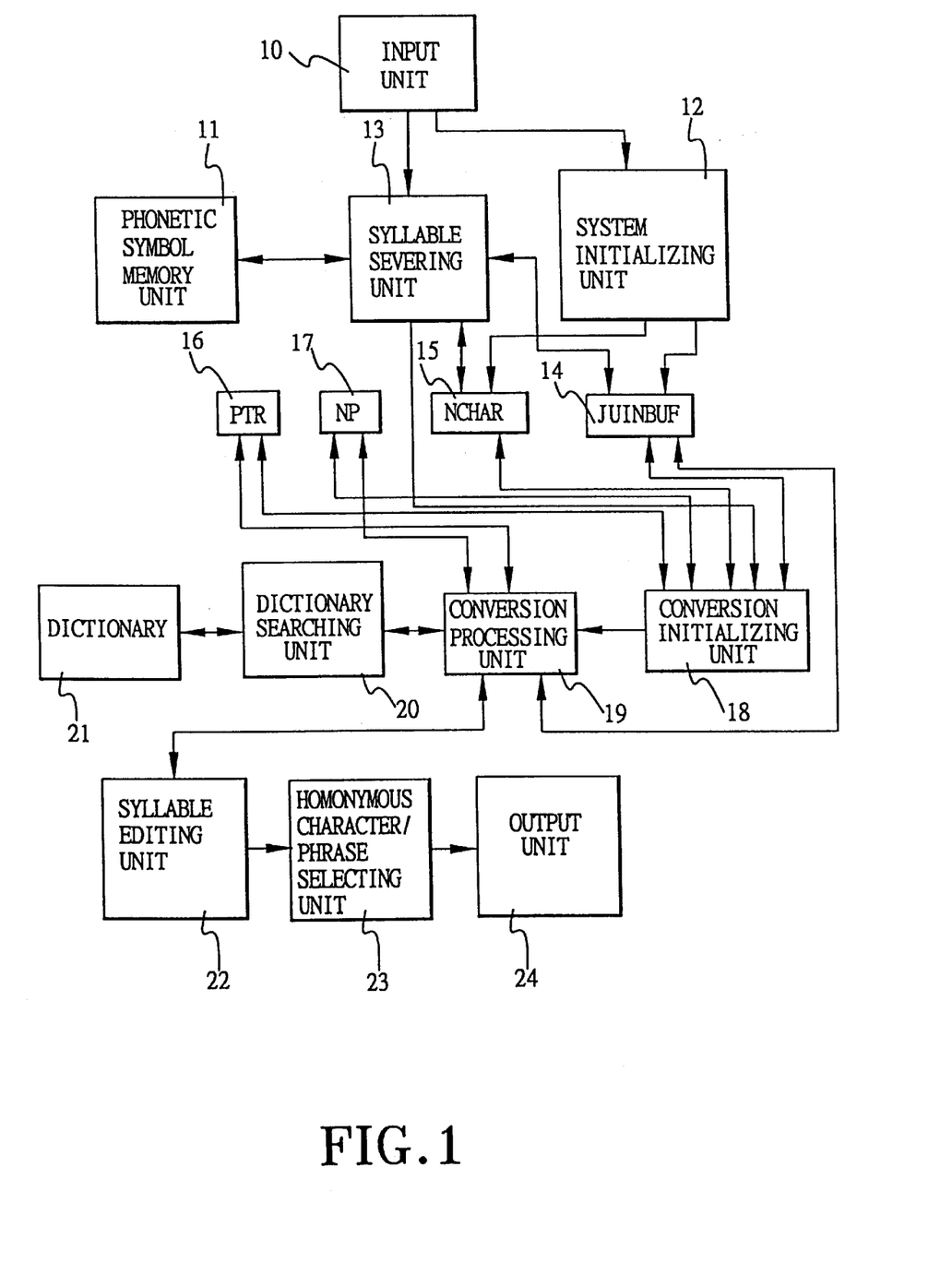
FIG. 1 is a block diagram of a preferred embodiment of a Chinese character conversion apparatus according to the present invention.
Figure 2:
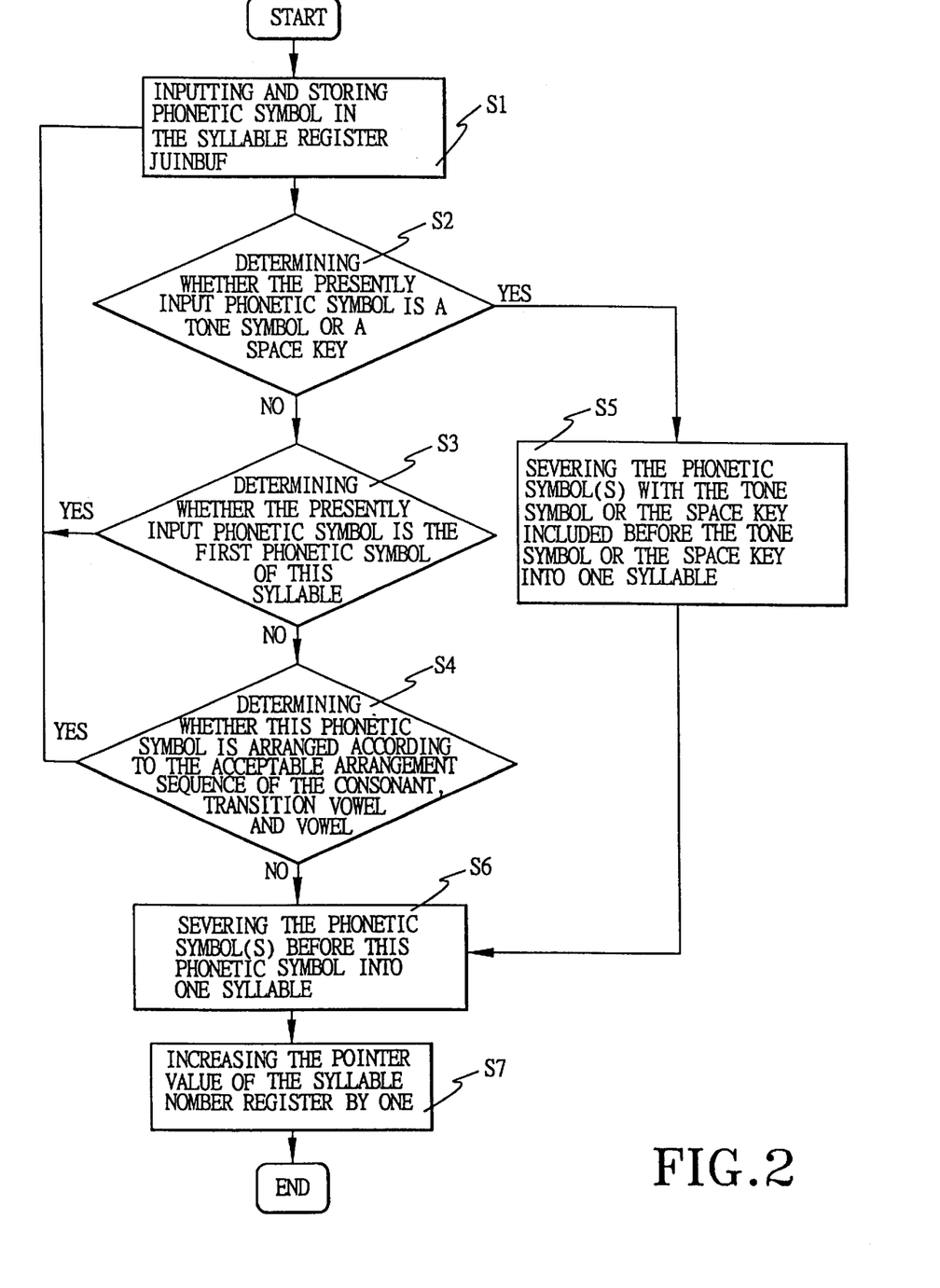
FIG. 2 is an operation flow chart of the syllable severing unit of the preferred embodiment according to the present invention.
Figure 4:
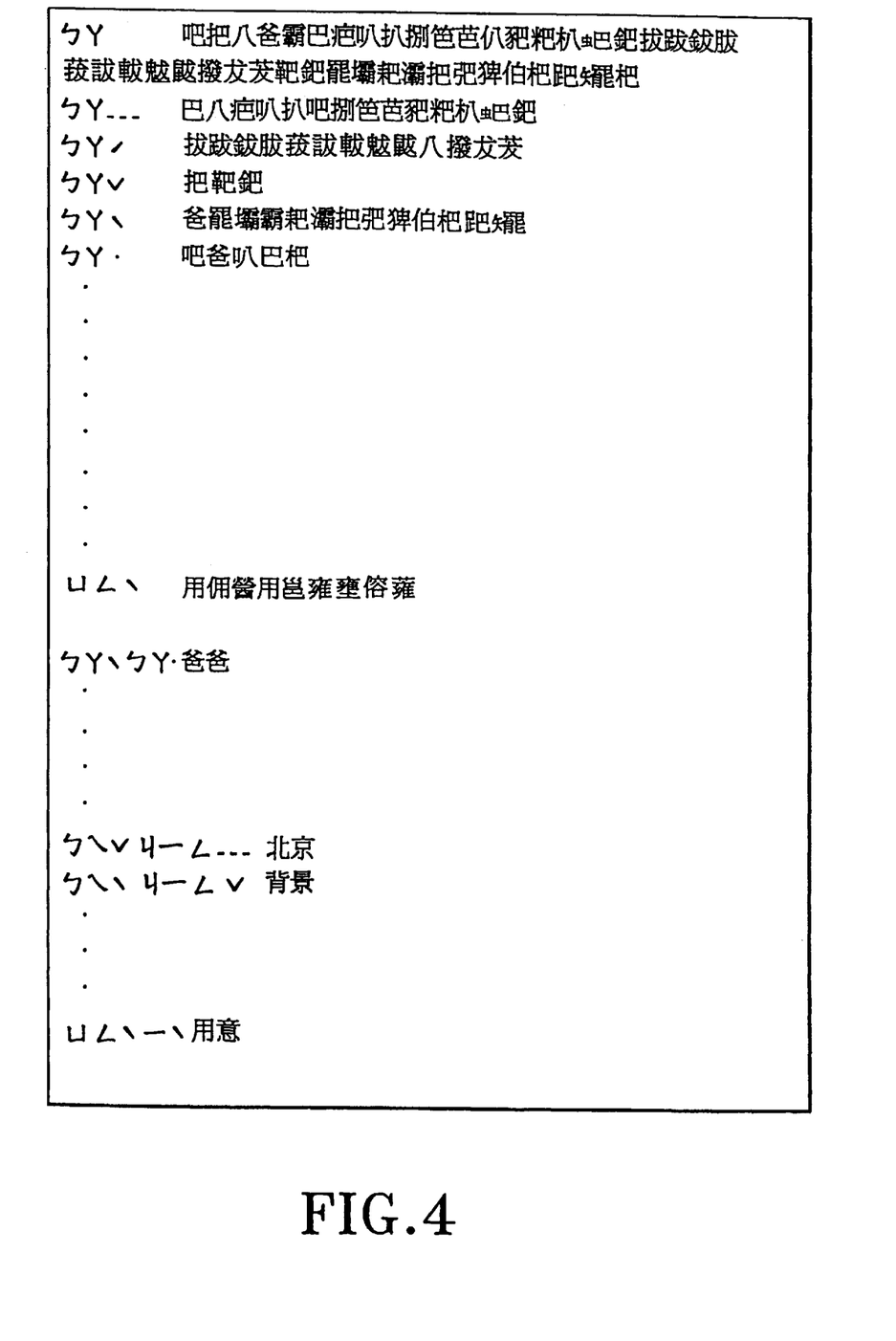
FIG. 4 is a structural diagram of the dictionary of the preferred embodiment according to the present invention.
Figure 6:
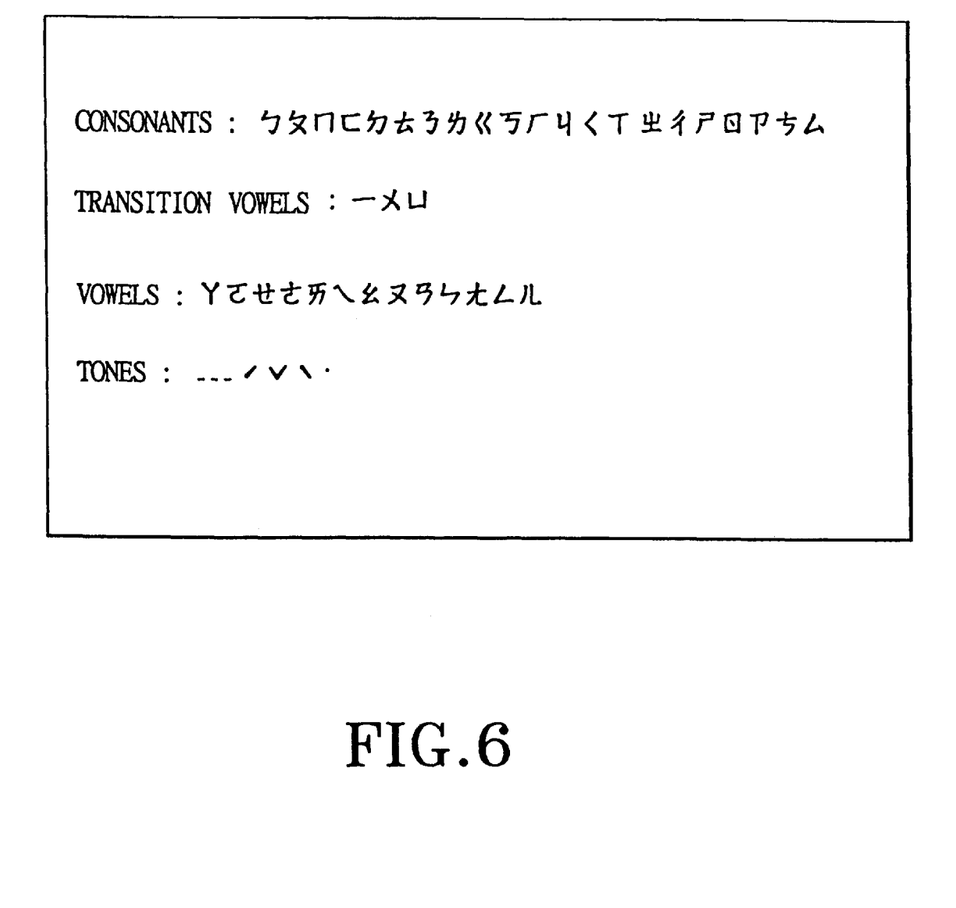
FIG. 6 is a structural diagram of the phonetic symbol memory unit of the preferred embodiment according to the present invention.

FIG. 1 is a block diagram of a preferred embodiment of a Chinese character conversion apparatus according to the present invention. In FIG. 1, reference numeral 10 denotes an input unit for inputting phonetic symbols. Reference numeral 11 denotes a phonetic symbol memory unit for storing all of the phonetic symbols for the consonants, transition vowels, vowels and tones, as shown in FIG. 6. Reference numeral 21 denotes a dictionary for storing a plurality of syllable streams and their corresponding Chinese characters, as shown in FIG. 4. Reference numeral 13 denotes a syllable severing unit. Each syllable has a corresponding Chinese character. The detail operation flow chart of the syllable severing unit 13 is shown in FIG. 2.

Reference numeral 14 denotes a JUINBUF syllable register for storing each of the syllables after being severed. Reference numeral 15 denotes a NCHAR register for storing the number of syllables of the entire syllable stream. Reference numerals 16 and 17 respectively denotes PTR register and NP register used when the syllable stream is converted into phrases. PTR register is a register for storing the position from which the input syllable stream is started to be converted, simply called "a conversion position register"NP register is a register for storing the number of converted syllables of the input syllable stream, simply called "a conversion length register". That is, if ptr and np are respectively stored in the PTR register and NP register, the dictionary searching key is successive np syllables from the ptr-th syllable of the input syllable stream. (Hereinafter, nchar, np and ptr represent the value stored in the NCHAR, NP and PTR registers, respectively.)

Reference numeral 12 denotes a system initializing unit for initializing the NCHAR register 15, which sets the syllable number nchar to 0 at the beginning of the activation of the input system. Reference numeral 18 denotes a conversion initializing unit. If the number of syllables of the input syllable stream is larger than the number (max) of characters of the longest phrase stored in the dictionary 21 (max is set to 5 in the present embodiment), the value of max is set into the NP register 17, and the conversion position ptr is set to the position of the n-th (n=max) syllable back from the syllable number (nchar) of the syllable stream; otherwise, the value of the syllable number (nchar) is set to np, and ptr is set to the first position of this syllable stream.

Reference numeral 19 denotes a conversion processing unit for controlling the number of syllables of the input syllable stream. The conversion processing unit 19 sets the syllable number (np) starting from the syllable position pointed by ptr as the syllable for conversion, and sends it to the dictionary searching unit 20 for character/phrase searching. If no corresponding character/phrase is searched, ptr is increased by one and np is decreased by one for further character/phrase searching. The aforementioned operation is kept going until a phrase or a character is searched.

Reference numeral 20 denotes a dictionary searching unit which selects an usually used character/phrase from the homonymous characters/phrases in the dictionary 21 by searching the dictionary 21 with the syllable from the NP register 17 as the dictionary searching key, and which provides the result to the conversion processing unit 19. Reference numeral 22 denotes a syllable editing unit which provides the character/phrase from the conversion processing unit 19 to the user for the determination as to whether there is any mistake in syllable severing. If there is a mistake in syllable severing, the user can make a correction to the mistake. For example, when the characters "天" is converted based on the result of the syllable severing unit 13 although the phrase "提案" is desired with the input syllable stream "ㄊㄧㄢ", the user can amend the input syllable stream to "ㄊㄧ/ㄢ" by the syllable editing unit 22, wherein (\) is defined as a manual severing key in the present invention. The amended input syllable stream is fed back to the conversion processing unit 19 so as to convert a correct result.

Reference numeral 23 denotes a homonymous character/phrase selecting unit which provides the character/phrase from the conversion processing unit 19 to the user for the determination as to whether there is any mistake in homonymous character/phrase selection. If there is a mistake in the homonymous character/phrase selection, the user can make a correction to the mistake. For example, when "悠閒" is converted based on the top priority of the homonymous character/phrase although "有限" is desired by the user with the input syllable stream "ㄧㄒㄧㄢ", the user can make a character/phrase selection after the homonymous character/phrase determination is determined to be incorrect so as to obtain the phrase "有限" of second priority, thereby obtaining the correct result.

The explanation of how to sever syllable according to the acceptable arrangement sequence of the consonant, transition vowel and vowel will now be described with reference to the flow chart shown in FIG. 2.

Referring to FIG. 2, in step S1, a phonetic symbol is inputted and stored in the syllable register JUINBUF. In step S2, it is determined that whether the presently input phonetic symbol is a tone symbol or a space key. If the presently input phonetic symbol is a tone symbol or a space key, the flow proceeds to step S5 to set syllable, completing the severing of this syllable. Then, the conversion initializing unit 18 prepares to perform the conversion of the character/phrase, and the phonetic symbol input number of the next syllable is set to 0. If the presently input phonetic symbol is not a tone or space key, the flow proceeds to step S3 to perform a further determination.

In the step S3, it is determined that whether the presently input phonetic symbol is the first phonetic symbol of this syllable. If the presently input phonetic symbol is the first phonetic symbol of this syllable, the flow returns to step S1 for reading the next phonetic symbol; otherwise, the flow proceeds to step S4 to determine that whether this phonetic symbol is arranged in sequence.

In the step S4, it is determined that whether this input phonetic symbol is arranged according to the acceptable arrangement sequence of the consonant, transition vowel and vowel. That is, a consonant can only be followed by a transition vowel or a vowel, a transition vowel can only be followed by a vowel. If this phonetic symbol is arranged in sequence, the flow returns to the step S1 for reading the next input phonetic symbol; otherwise, the flow proceeds to step S6 for the syllable severing process.

In step S5, the phonetic symbol(s) with the tone symbol or the space key included before the tone symbol or the space key is severed into one syllable. The number of phonetic symbols of the next syllable is set to 0. The flow proceeds to step S7 for the preparation of the character/phrase conversion.

In step S6, the phonetic symbol(s) before this phonetic symbol is severed into one syllable so as to complete the severing of this syllable. Afterwards, the presently input phonetic symbol is set as the first phonetic symbol of the next syllable, and the phonetic symbol input number of the next syllable is set to 1. Then, the flow proceeds to step S7 for the preparation of the character/phrase conversion.

In step S7, the pointer value of the syllable number register is increased by one, and the conversion initializing unit 18 receives the completed syllable for the preparation of the character/phrase conversion.

Figure 3:
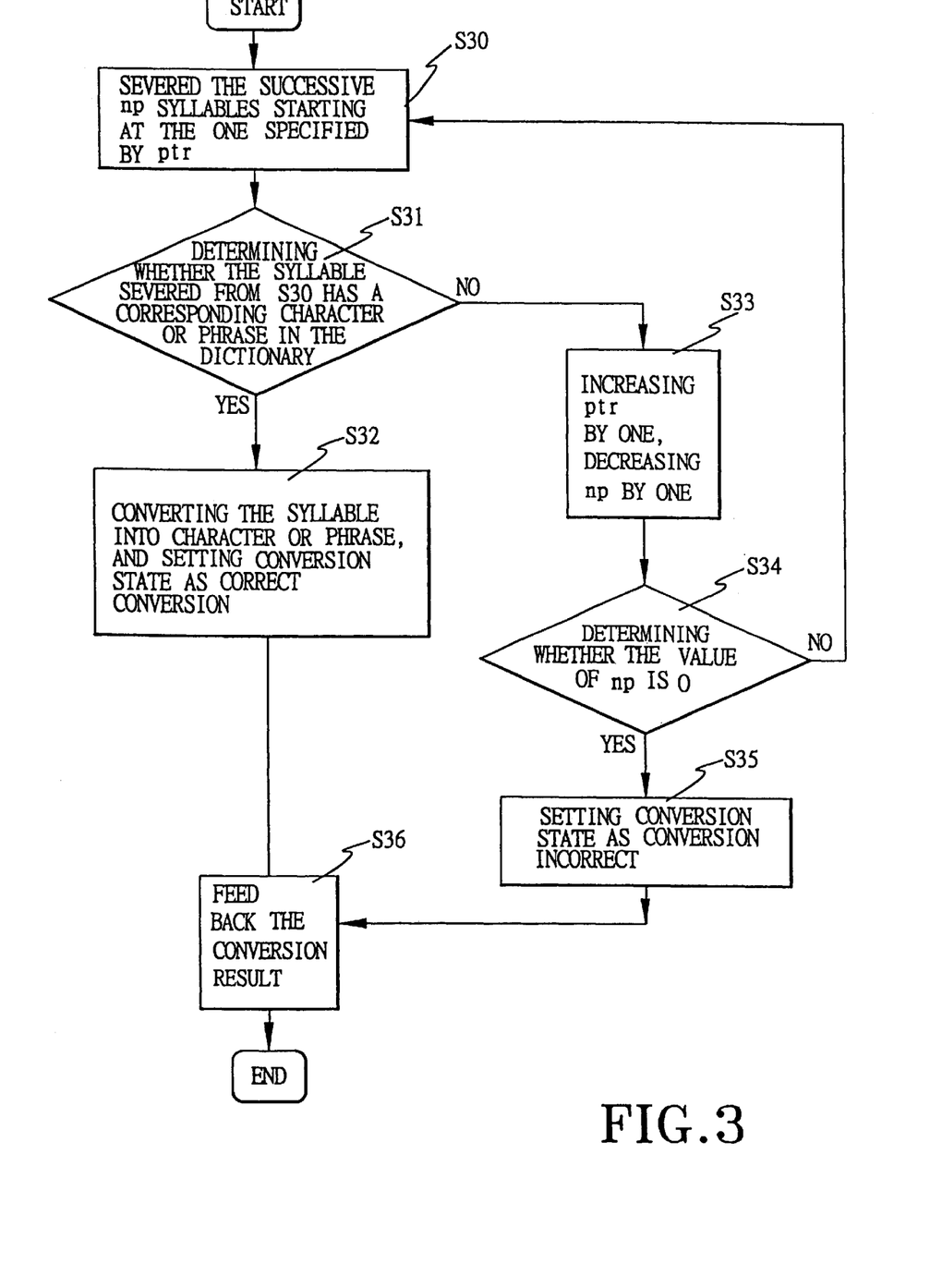
FIG. 3 is an operation flow chart of the conversion processing unit of the preferred embodiment according to the present invention.

The operation of the conversion processing unit 19 will now be described with reference to FIG. 3.

In step S30, the successive np syllables starting at the one specified by ptr whose value is set in the conversion initializing unit 18 are severed.

In step S31, the dictionary is searched for the character or phrase which corresponds to the syllable severed from step S30. If there is a corresponding character or phrase, the flow proceeds to step S32; otherwise, the flow proceeds to step S33. In step S32, starting at the syllable specified by ptr, the successive np syllables in the input syllable stream are converted to a phrase searched out in step S31, setting the conversion state as correct conversion. Then, the flow proceeds to step S35 for feed back operation.

In step S33, the value of ptr is increased by one so as to point to the next syllable position. The value of np is decreased by one. The flow proceeds to step S34 to determine whether the present np is 0 or not. In step S34, it is determined that whether np is 0 or not. If np is 0, representing no corresponding character or phrase is searched from the dictionary, and determining that the input syllable is an unreasonable syllable. The flow proceeds to step S35 to set the conversion state to an incorrect conversion. If np is not equal to 0, the flow proceeds to step S30 to perform the conversion of the np syllables which are set again.

In step S35, the conversion state is set to incorrect conversion, and the flow proceeds to step S36 for feed back operation. In step S36, the converted state by the conversion processing unit 19 is fed back to the syllable severing unit 13.

FIG. 4 illustrates a part of the structure of the dictionary of the preferred embodiment. The contents of the dictionary includes syllable with the corresponding characters, and syllable stream with the corresponding phrases.

The operation of the present invention will be described as follows, taking the input syllable stream "ㄍㄨㄢㄩㄘㄊㄧㄢㄉㄜㄅㄟㄐㄧㄥ" for "關於此提案的背景" as an example.

1. The activation of the input system

The number of syllables (nchar) is set to 0 by the system initializing unit 12, indicating that there is no syllable in the syllable register JUINBUF 14. The Chinese character conversion apparatus of the present invention is waiting for the input of a first phonetic symbol.

2. The input of the phonetic symbol "ㄍ"

According to the flow chart of FIG. 2, after this input phonetic symbol is stored in the syllable register JUINBUF 14 in the step S1, this input phonetic symbol is determined to be not a tone symbol in the step S2. The flow proceeds to step S3 to determine that this phonetic symbol is the first phonetic symbol of this syllable. Then, the flow returns to the step S1 for reading the next input phonetic symbol.

3. The input of the phonetic symbol "ㄨ"

According to the flow chart of FIG. 2, after this input phonetic symbol is stored in the syllable register JUINBUF 14 following the preceding phonetic symbol "ㄍ" if in the step S1, this phonetic symbol is determined to be not a tone symbol in the step S2. The flow proceeds to the step S3 to determine that this symbol is not the first phonetic symbol of this syllable. Then, the flow proceeds to the step S4 to determine that whether this phonetic symbol is arranged according to the acceptable arrangement sequence of the consonant, transition vowel and vowel. The determination result is a consonant followed by a transition vowel, since "ㄍ" is a consonant while "ㄨ" is a transition vowel, so that the flow returns to the step S1 for reading the next input phonetic symbol.

4. The input of the phonetic symbol "ㄢ"

According to the flow chart of FIG. 2, after this input phonetic symbol is stored in the syllable register JUINBUF 14 following the preceding phonetic symbol "ㄨ" in the step S1, this phonetic symbol is determined to be not a tone symbol in the step S2. After this phonetic symbol is determined to be not the first phonetic symbol of this syllable in step S3, the flow proceeds to the step S4 to determine that whether this phonetic symbol is arranged according to the acceptable arrangement sequence of the consonant, transition vowel and vowel. The determination result is a transition vowel followed by a vowel since "ㄨ" is a transition vowel while "ㄢ" is a vowel, so that the flow returns to the step S1 for reading the next input phonetic symbol.

5. The input of the phonetic symbol "ㄩ"

According to the flow chart of FIG. 2, after this input phonetic symbol is stored in the syllable register JUINBUF 14 following the preceding phonetic symbol "ㄢ" in the step S1, this phonetic symbol is determined to be not a tone symbol in the step S2. After this phonetic symbol is determined to be not the first phonetic symbol of this syllable in step S3, the flow proceeds to the step S4 to determine that whether this phonetic symbol is arranged according to the acceptable arrangement sequence of the consonant, transition vowel and vowel. The determination result is a vowel followed by a transition vowel, since "ㄩ" is a transition vowel while "ㄢ" is a vowel, so that the flow proceeds to the step S5 to perform the severing of syllable. In the step S5, the phonetic symbol "ㄩ" is severed from the preceding phonetic symbols "ㄍㄨㄢ" and is set as the first phonetic symbol of the next syllable. At this time, the preceding phonetic symbols "ㄍㄨㄢ" is set as one syllable, and the input syllable number (nchar) is increased by one, so that the input syllable number (nchar) is presently equal to one. The syllable constituted by the phonetic symbols "ㄍㄨㄢ" is provided to the conversion initializing unit 18 for the preparation of character/phrase conversion. In the conversion initializing unit 18, since the syllable number (nchar) is less than the longest character number (5) of the dictionary 21, the value (1) of nchar is set as the conversion length (np). After the conversion starting position is set to the front position (1), the conversion processing unit 19 performs the conversion. In the conversion processing unit 19, the conversion length (np) and the syllable pointed by ptr, that is, "ㄍㄨㄢ", is searched through the dictionary searching unit 20. In the dictionary searching unit 20, since "ㄍㄨㄢ" has only one syllable, the part of the homonymous character is searched. The homonymous characters corresponding to the phonetic symbols "ㄍㄨㄢ" are as follows: ㄍㄨㄢ 管關官觀貫冠館慣罐棺灌盥鰥綸倌田瘝矜銀莞涫摜琯脘(g u an)胱痯筦錧斡逭摜鸛卝悹祼瓘鑵悹爟爟鑵鱹

The character of the top priority, that is, "管" is selected and is fed back to the conversion processing unit 19 for the determination of completing the conversion of the first character. Then, the flow returns to the input unit 10, waiting for the input of the next phonetic symbol.

6. The input of the phonetic symbol "ㄒ"

According to the flow chart of FIG. 2, after this input phonetic symbol is stored in the syllable register JUINBUF 14 following the preceding phonetic symbol "ㄩ" in the step S1, this phonetic symbol is determined to be not a tone symbol in the step S2. After this phonetic symbol is determined to be not the first phonetic symbol of this syllable in step S3 since this syllable has already contained the previously input phonetic symbol "ㄩ", the flow proceeds to the step S4 to determine that whether this phonetic symbol is arranged according to the acceptable arrangement sequence of the consonant, transition vowel and vowel. The determination result is a consonant followed by a transition vowel, since the "ㄒ" is a consonant while "ㄩ" is a transition vowel, so that the flow proceeds to the step S5 to perform the severing of syllable. In the step S5, the phonetic symbol "ㄒ" is severed from the preceding phonetic symbols "ㄩ" and is set as the first phonetic symbol of the next syllable. At this time, the preceding phonetic symbols "ㄩ" is set as one syllable, and the input syllable number (nchar) is increased by one, so that the input syllable number (nchar) is presently equal to two. The syllable constituted by the phonetic symbol "ㄩ" is provided to the conversion initializing unit 18 for the preparation of the character/phrase conversion. In the conversion initializing unit 18, since the syllable number (nchar) is less than the longest character number (5) of the dictionary 21, the value (2) of nchar is set to the conversion length (np). After the conversion starting position is set to the front location (1), the conversion process unit 19 performs the conversion. In the conversion process unit 19, the conversion length (np) and the syllable pointed by ptr, that is, "ㄍㄨㄢ" and "ㄩ", are searched through the dictionary searching unit 20. In the dictionary searching unit 20, since "ㄍㄨㄢ" and "ㄩ" are two syllables, the part of homonymous phrase is searched. The homonymous phrase corresponding to the phonetic symbols "ㄍㄨㄢ" and "ㄩ" is as follows: ㄍㄨㄢㄩ／關於

Since the phonetic symbols of all characters are stored in the dictionary of the present invention with the tone symbol, "關於" can be searched no matter which one of the phonetic symbols "ㄍㄨㄢㄩ" and "ㄍㄨㄢㄩ／" is inputted. At this time, the phrase "關於" is selected since only this phrase is stored in the dictionary 21. The selected phrase is fed back to the conversion process unit 19 for the determination of completing the conversion of two characters. At the same time, the first character that is converted previously is amended to "關" in accordance to the present conversion result and the process returns to the input unit 10, waiting for the input of next phonetic symbol.

7. The input of the phonetic symbol "ㄊ"

According to the flow chart of FIG. 2, after this input phonetic symbol is stored in the syllable register JUINBUF 14 following the preceding phonetic symbol "ㄒ" in the step S1, this phonetic symbol is determined to be not a tone symbol in the step S2. After this phonetic symbol is determined to be not the first phonetic symbol of this syllable in step S3 since this syllable has already contained the previously input phonetic symbol "ㄒ", the flow proceeds to the step S4 to determine that whether this phonetic symbol is arranged according to the acceptable arrangement sequence of the consonant, transition vowel and vowel. The determination result is a consonant followed by a consonant, since the "ㄊ" is a consonant while "ㄒ" is also a consonant, so that the flow proceeds to the step S5 to perform the severing of syllable. In the step S5, the phonetic symbol "ㄊ" is severed from the preceding phonetic symbols "ㄎ" and is set as the first phonetic symbol of the next syllable. At this time, the preceding phonetic symbols "ㄊ" is set as one syllable, and the input syllable number (nchar) is increased by one, so that the input syllable number (nchar) is presently equal to three. The syllable constituted by the phonetic symbol "ㄎ" is provided to the conversion initializing unit 18 for the preparation of character/phrase conversion. In the conversion initializing unit 18, since the syllable number (nchar) is less than the longest character number (5) of the dictionary 21, the value (3) of nchar is set to the conversion length (np). After the conversion starting position is set to the front location (1), the conversion processing unit 19 performs the conversion. In the conversion processing unit 19, the conversion length (np) and the syllable pointed by ptr, that is, "ㄍㄨㄢ", "ㄩ" and "ㄎ" are searched through the dictionary searching unit 20. In the dictionary searching unit 20, since "ㄍㄨㄢ", "ㄩ" and "ㄎ" are three syllables, the part of homonymous phrase is searched. It is found that there is no corresponding phrase in the dictionary 21, so that the conversion processing unit 19 reduces the conversion length (np) by one, that is, ptr is increased by one to obtain a value of two, so as to perform the conversion from the second syllable. That is, the dictionary searching unit 20 searches the dictionary 21 for the phonetic symbols "ㄩ" and "ㄎ". In the dictionary searching unit, since "ㄩ" and "ㄎ" are two syllables, the part of homonymous phrase is searched. The homonymous phrase corresponding to the phonetic symbols "ㄩ" and "ㄎ" is as follows: ㄩ/ㄎ\ 魚刺

The conversion processing unit 19 compares the using frequency of "魚刺" with that of "關於". It is found that the using frequency of "魚刺" is lower than that of "關於", so the phrase "魚刺" is unaccepted and the conversion length (np) is reduced by one again to obtain the value of one, that is, ptr is increased by one again to obtain a value of three. The conversion is started from the third syllable, that is, the dictionary searching unit 20 searches the dictionary 21 for the phonetic symbol "ㄎ". In the dictionary searching unit 20, since "ㄎ" is one syllable, the part of homonymous character is searched. The homonymous characters corresponding to the phonetic symbol "ㄎ" are as follows:

ㄎ 此次刺詞辭慈瓷疵 祠伺賜雌差庇恣嵯鶿趑螄呰玼郪觝懋磁茨
(c)呲柯鶨蠀螆茈鷀齊玼 粢鉐鼒佌泚呲 束佽螆荆裁廁庛飫粲

The character of top priority, that is, "此", is selected and is fed back to the conversion processing unit 19 for the determination of completing the conversion of the first character. Then, the flow returns to the input unit 10, waiting for the input of next phonetic symbol.

8. The input of the phonetic symbol "ㄧ"

According to the flow chart of FIG. 2, after this input phonetic symbol is stored in the syllable register JUINBUF 14 following the preceding phonetic symbol "ㄊ" in the step S1, this phonetic symbol is determined to be not a tone symbol in the step S2. After this phonetic symbol is determined to be not the first phonetic symbol of this syllable in step S3, the flow proceeds to the step S4 to determine that whether this phonetic symbol is arranged according to the acceptable arrangement sequence of the consonant, transition vowel and vowel. The determination result is a consonant followed by a transition vowel, since "ㄊ" is a consonant while "ㄧ" is a transition vowel, so that the flow returns to the step S1 for reading the next input phonetic symbol.

9. The input of the phonetic symbol "ㄢ"

According to the flow chart of FIG. 2, after this input phonetic symbol is stored in the syllable register JUINBUF 14 following the preceding phonetic symbol "ㄧ" in the step S1, this phonetic symbol is determined to be not a tone symbol in the step S2. After this phonetic symbol is determined to be not the first phonetic symbol of this syllable in step S3, the flow proceeds to the step S4 to determine that whether this phonetic symbol is arranged according to the acceptable arrangement sequence of the consonant, transition vowel and vowel. The determination result is a transition vowel followed by a vowel, since "ㄧ" is a transition vowel while "ㄢ" is a vowel, so that the flow returns to the step S1 for reading the next input phonetic symbol.

10. The input of the phonetic symbol "ㄋ"

According to the flow chart of FIG. 2, after this input phonetic symbol is stored in the syllable register JUINBUF 14 following the preceding phonetic symbol "ㄢ" in the step S1, this phonetic symbol is determined to be not a tone symbol in the step S2. After this phonetic symbol is determined to be not the first phonetic symbol of this syllable in step S3 since this syllable has already contained the previously input phonetic symbol "ㄢ", the flow proceeds to the step S4 to determine that whether this phonetic symbol is arranged according to the acceptable arrangement sequence of the consonant, transition vowel and vowel. The determination result is a vowel followed by a consonant, since "ㄢ" is a vowel while "ㄋ" is a consonant, so that the flow proceeds to the step S5 to perform the severing of syllable.

In the step S5, the phonetic symbol "ㄋ" is severed from the preceding phonetic symbols "ㄢ" and is set as the first phonetic symbol of the next syllable. At this time, the preceding phonetic symbols "ㄊㄧㄢ" are set to be one syllable, and the input syllable number (nchar) is increased by one, so that the input syllable number (nchar) is presently equal to four. The syllable constituted by the phonetic symbols "ㄊㄧㄢ" are provided to the conversion initializing unit 18 for the preparation of character/phrase conversion. In the conversion initializing unit 18, since the syllable number (nchar) is less than the longest character number (5) of the dictionary 21, the value (4) of nchar is set to the conversion length (np).

After the conversion starting position is set to the front location (1), the conversion processing unit 19 performs the conversion. In the conversion processing unit 19, the conversion length (np) and the syllable pointed by ptr, that is, "ㄍㄨㄢ", "ㄩ", "ㄎ" and "ㄊㄧㄢ" are searched through the dictionary searching unit 20. In the dictionary searching unit 20, since "ㄍㄨㄢ", "ㄩ", "ㄎ" and "ㄊㄧㄢ" are four syllables, the part of the homonymous phrase is searched. It is found that there is no corresponding phrase in the dictionary 21, so that the conversion processing unit 19 reduces the conversion length (np) by one to obtain a value of three, that is, ptr is increased by one to obtain a value of two, so as to perform the conversion from the second syllable. That is, the dictionary searching unit 20 searches the dictionary 21 for the phonetic symbols "ㄩ", "ㄎ" and "ㄊㄧㄢ". In the dictionary searching unit 20, since "ㄩ", "ㄎ" and "ㄊㄧㄢ" are three syllables, the part of the homonymous phrase is searched.

It is found that there is no corresponding phrase in the dictionary 21, so that the conversion processing unit 19 reduces the conversion length (np) by one to obtain a value of two, that is, ptr is increased by one to obtain a value of three, so as to perform the conversion from the third syllable.

That is, the dictionary searching unit 20 searches the dictionary 21 for the phonetic symbols "ㄘ" and "ㄊㄧㄢ". In the dictionary searching unit 20, since "ㄩ", "ㄘ" and "ㄊㄧㄢ" are two syllables, the part of homonymous phrase is searched. It is found that there is no corresponding phrase in the dictionary 21, so that the conversion processing unit 19 reduces the conversion length (np) by one to obtain a value of one, that is, ptr is increased by one to obtain a value of four, so as to perform the conversion from the fourth syllable. That is, the dictionary searching unit 20 searches the dictionary 21 for the phonetic symbols "ㄊㄧㄢ". In the dictionary searching unit 20, since "ㄊㄧㄢ" is one syllable, the part of homonymous character is searched. The homonymous characters corresponding to the phonetic symbols "ㄊㄧㄢ" are as follows:

ㄊㄧㄢ 天添供屆阽姝舔忝殄腆靦涊話覥倸蚕覥琠田甜塡恬闐敁 (t i an)窴泹昤湉菾磌沾苫滇銛旬嗔搷鷏鎮佃典䒼搟紾話

The character of top priority, that is, "天", is selected and is fed back to the conversion processing unit 19 for the determination of completing the conversion of the fourth character. Then, the flow returns to the input unit 10, waiting for the input of next phonetic symbol.

11. The input of the phonetic symbols "ㄜ", "ㄅ", "ㄥ", "ㄐ" and "ㄧ"

Since the input, determination and conversion of these phonetic symbols are as same as the aforementioned phonetic symbols, the descriptions thereof are omitted herein.

12. The input of the phonetic symbol "ㄥ"

According to the flow chart of FIG. 2, after this input phonetic symbol is stored in the syllable register JUINBUF 14 following the preceding phonetic symbol "ㄧ" in the step S1, this phonetic symbol is determined to be not the first phonetic symbol of this syllable in step S3, the flow proceeds to the step S4 to determine that whether this phonetic symbol is arranged according to the acceptable arrangement sequence of the consonant, transition vowel and vowel. The determination result is a transition vowel followed by a vowel, since "ㄧ" is a transition vowel while "ㄥ" is a vowel, so that the flow returns to the step S1 for reading the next input phonetic symbol.

13. The input of the space key

According to the flow chart of FIG. 2, after this phonetic symbol is stored in the syllable register JUINBUF 14 following the preceding phonetic symbol "ㄥ" in the step S1, this phonetic symbol is determined to be a space key in the step S2 and the phonetic symbols "ㄐㄧㄥ" are set as one syllable. The input syllable number (nchar) is increased by one, so that the input syllable number (nchar) is presently equal to seven. The syllable constituted by the phonetic symbols "ㄐㄧㄥ" are provided to the conversion initializing unit 18 for the preparation of character/phrase conversion.

In the conversion initializing unit 18, since the syllable number (nchar) is larger than the longest character number (5) of the dictionary 21, the value (5) of nchar is set as the conversion length (np). After the conversion starting position is set to the location which is the 5th position back from the syllable number of the syllable stream, that is, the position of the third syllable, the conversion process unit 19 performs the conversion. In the conversion process unit 19, the conversion length (np) and the syllable pointed by ptr, that is, "ㄘ", "ㄊㄧㄢ", "ㄅㄜ", "ㄅㄥ" and "ㄐㄧㄥ" are searched through the dictionary searching unit 20. In the dictionary searching unit 20, since "ㄘ", "ㄊㄧㄢ", "ㄅㄜ", "ㄅㄥ" and "ㄐㄧㄥ" are five syllables, the part of homonymous phrase is searched. It is found that there is no corresponding phrase in the dictionary 21, so that the dictionary searching unit 20 repeatedly performs the aforementioned operation until two syllables are remained, "ㄅㄥ" and "ㄐㄧㄥ". In the dictionary searching unit 20, since "ㄅㄥ" and "ㄐㄧㄥ" are two syllables, the part of homonymous phrase is searched. The phrases corresponding to the phonetic symbols "ㄅㄥ" and "ㄐㄧㄥ" are as follows:

ㄅㄟˇㄐㄧㄥ 北京
ㄅㄟˋㄐㄧㄥˇ 背景

According to the using frequency, the phrase "北京" is selected and fed back to the conversion processing unit 19 for the determination of completing the seventh character. The sixth character is automatically amended to "北" and the flow returns to the input unit 10, waiting for the input of next phonetic symbol.

At this time, the input of the entire syllable stream "ㄍㄢㄩㄊㄧㄢㄅㄜㄊㄧㄢㄅㄥㄐㄧㄥ" is completed. However, the conversion result is "關於此天的北京", which is not the result "關於此提案的背景" that is desired by the user. There are two mistakes found by the user, one is "天" and the other is "北京". The mistake of "天" is caused by the syllable severing unit 13 because the input phonetic symbols "ㄊㄧㄢ" are desired to be converted into a two word phrase "ㄊㄧ" and "ㄢ". The mistake of "北京" is caused by the comparing result of the using frequency.

As mentioned above, about all the errors caused by syllable severing a syllable editing unit can be performed to recover the phonetic symbols "ㄊㄧㄢ" for "天" and to amend the input phonetic symbols to "ㄊㄧ—ㄢ" by adding a "—" for separation. Then, the same operation as described above may be performed to convert the result "關於此提案的北京" through the conversion processing unit 19 and the dictionary searching unit 20.

The mistake of "北京" may be corrected through a homonymous character/phrase selecting unit 23 which displays all homonymous phrases corresponding to "北京" on the display device for the selection of the desired phrase "背景" by the user. After the selection of "背景" by the user, the incorrect result "關於此提案的北京" will be automatically amended to "關於此提案的背景".

A desired result satisfying the user will be converted after the operation of the syllable editing unit and the homonymous character/phrase selecting unit is performed.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements. For example, a space key may be inputted after any syllable is inputted so that the mistake made by the syllable severing unit can be avoided. For example, the character "替" of top priority is converted when the phonetic symbols "ㄊㄧ" are followed by a space key. Then, the phrase "提案" is converted when the phonetic symbol "ㄢ" followed by a space key is inputted. Furthermore, a tone symbol may be added in the input procedure of some syllable so that not only the severing of syllable is operated manually, but the homonymous characters/phrases of these syllables can be avoided.

For example, if the input phonetic symbols "ㄅㄟㄐㄧㄥ" are amended to "ㄅㄟㄐㄧㄥ", since "北京" is in consist with the conversion of these phonetic symbols, only the phrase "背景" will be converted.

As mentioned above, the Chinese character conversion apparatus of the present invention can sever automatically the successive input phonetic symbols into a plurality of syllables that are in consistent with the phonetic combination rule, no matter whether there is a tone symbol input or not. Each syllable or each syllable stream constituted from a plurality of syllables has a group of corresponding homonymous characters or phrases in the dictionary. Since the input of tone symbol may be omitted in the present invention, the input speed of the user may be increased. Furthermore, incorrect input caused by incorrect tone symbol can thus be avoided.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A Chinese character conversion apparatus without tone symbol input, comprising:

a phonetic symbol memory unit for storing a plurality of symbols for consonants, transition vowels, vowels and tones of Chinese language;

a dictionary for storing a plurality of syllable streams and the corresponding Chinese characters and phrases;

a syllable severing unit which severs an input phonetic symbol row into at least one syllable according to a tone symbol or a space key, if no tone symbol or space key being inputted, said syllable severing unit severing said input phonetic symbol row into said syllables according to the acceptable arrangement sequence of the consonant, transition vowel and vowel in said phonetic symbol memory unit;

a conversion initializing unit for composing the desired syllable stream according to the above severed syllables and the previously inputted ones, and then for setting the starting conversion position in the composed stream and its conversion length;

a conversion processing unit for repeatedly adjusting said syllable stream constituted by said conversion starting position and said conversion length according to set said conversion starting position and said conversion length;

a dictionary searching unit for searching said dictionary for Chinese character/phrase with said syllable stream from said conversion processing unit as a searching key;

a syllable editing unit operable by an user to amend said Chinese character searched from said dictionary due to a mistake made by said syllable severing unit; and a homonymous character/phrase selecting unit operable by an user to select a correct Chinese character/phrase other than said Chinese character/phrase searched from the dictionary due to a mistake made by the automatic determination of homonymous character/phrase.

* * * * *